United States Patent
Yakumaru et al.

(10) Patent No.: US 7,069,983 B2
(45) Date of Patent: Jul. 4, 2006

(54) AIR CONDITIONER

(75) Inventors: Yuuichi Yakumaru, Osaka (JP); Fumitoshi Nishiwaki, Hyogo (JP); Noriho Okaza, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/144,295

(22) Filed: Jun. 3, 2005

(65) Prior Publication Data

US 2005/0241818 A1    Nov. 3, 2005

Related U.S. Application Data

(63) Continuation of application No. PCT/JP2003/015449, filed on Dec. 3, 2003.

(30) Foreign Application Priority Data

Dec. 6, 2002  (JP) .............................. 2002-355430

(51) Int. Cl.
  *F25B 29/00*  (2006.01)
  *B60H 1/00*  (2006.01)
  *B60H 3/00*  (2006.01)

(52) U.S. Cl. ................. 165/202; 165/42; 165/43; 165/240; 62/324.1; 62/238.6; 62/323.1; 62/222; 62/513; 62/224; 62/114; 237/12.3 B (58) Field of Classification Search ............... 165/202, 165/42, 43, 240; 62/324.1, 238.6, 323.1, 62/229, 513, 222, 224, 114; 237/12.3 B
See application file for complete search history.

(56) References Cited

U.S. PATENT DOCUMENTS

| 5,669,226 A | * | 9/1997 | Kurahashi et al. ............ 62/229 |
| 5,819,551 A | * | 10/1998 | Fukumoto et al. ......... 62/324.1 |
| 6,047,770 A | * | 4/2000 | Suzuki et al. ............... 165/202 |
| 6,913,067 B1 | * | 7/2005 | Hesse ....................... 62/196.4 |

FOREIGN PATENT DOCUMENTS

DE    19644583 A1  *  4/1998

(Continued)

OTHER PUBLICATIONS

International Search Report for PCT/JP2003/015449, dated May 18, 2004.

(Continued)

*Primary Examiner*—John K. Ford
(74) *Attorney, Agent, or Firm*—RatnerPrestia (57) ABSTRACT

An air conditioner for a vehicle includes a refrigerant cycle having an evaporator which is disposed in a blowing duct and cools air by refrigerant evaporation in the blowing duct; a compressor setting the evaporated refrigerant at a high temperature and high pressure; a refrigerant-to-water heat exchanger heating cooling water by heat transfer from the refrigerant discharged from the compressor; and an expansion device decompressing the refrigerant discharged from the refrigerant-to-water heat exchanger. The air conditioner also includes a cooling water cycle having a heater core which is disposed on the downstream side of the evaporator; a radiator cooling the cooling water; a pump circulating the cooling water cooled by the radiator; a power engine cooled by the cooling water fed by the pump; and the refrigerant-to-water heat exchanger. The refrigerant cycle performs cooling for dehumidification by performing the operation of heating.

8 Claims, 10 Drawing Sheets

FOREIGN PATENT DOCUMENTS

| | | |
|---|---|---|
| JP | 6-183249 A | 7/1994 |
| JP | 8-197937 A | 8/1996 |
| JP | 09-066722 A | 3/1997 |
| JP | 9-112969 A | 5/1997 |
| JP | 2000-186857 A | 7/2000 |
| JP | 2002-274160 A | 9/2002 |
| WO | WO 9955544 A2 * | 11/1999 |
| WO | WO 200122012 A1 * | 3/2001 |
| WO | WO 2004056594 A1 * | 7/2004 |

OTHER PUBLICATIONS

Japanese Office Action for JP 2002-355430, dated Jun. 28, 2005, (untranslated).

* cited by examiner

AIR CONDITIONER

This application is a continuation of International Application PCT/JP2003/015449, filed Dec. 3, 2003, the contents of which are incorporated herein by reference.

TECHNICAL FIELD

The present invention relates to an air conditioner and an air conditioning method.

BACKGROUND OF THE INVENTION

In recent years, an electric vehicle has grown in demand from the viewpoint of global environment protection. However, because the capacity of a battery of the electric vehicle is not sufficient, a hybrid electric vehicle which uses an engine for driving assist or for power generation, and an electric vehicle which uses a fuel battery for power generation have been proposed.

The hybrid electric vehicle equipped with the engine for driving assist runs on a vehicle drive motor during urban driving and on the engine if the battery level is low or during suburban driving. On the other hand, the hybrid electric vehicle equipped with the engine for power generation runs on a vehicle drive motor and starts an engine to charge the battery if the battery level becomes low.

An air conditioner for a present electric vehicle generally drives a compressor (open type) of a refrigerant cycle on a vehicle drive motor. On the other hand, an air conditioner for the above-mentioned hybrid electric vehicle may cool a vehicle compartment inside by driving a compressor on an engine when the engine is in a drive condition. It may cool the vehicle compartment, when the engine is stopping, by driving the compressor using the vehicle drive motor, and, when a remaining battery level is low during the engine stopping, by starting the engine to drive the compressor.

However, two mechanisms are required: a mechanism for transmitting the rotation of an engine to the compressor and a mechanism for transmitting the rotation of a vehicle drive motor to the compressor, and also required is a clutch for switching these drive methods, increasing the system complexity and the cost.

On the other hand, a conventional air conditioner is structured so that a vehicle compartment inside may be heated by simply sending air to a heater core supplied with engine cooling water during heating operation, therefore when a temperature of cooling water is low, for example, at engine start-up, long time was required until an air-conditioning temperature in the vehicle compartment inside reaches a target temperature. At a low ambient temperature or the like, heating capacity was too small; therefore engine cooling water was heated with a PTC heater as an auxiliary heating means. Recent engines of other vehicle as well as the hybrid electric vehicle have been highly advanced and heat radiation from the engine has decreased; therefore the engine cooling water was heated with the PTC heater as an auxiliary heating means. Because an electric heater such as the PTC heater was used as an auxiliary heating means, heating efficiency was lower than that of a heat pump type heating apparatus.

Figure 10:
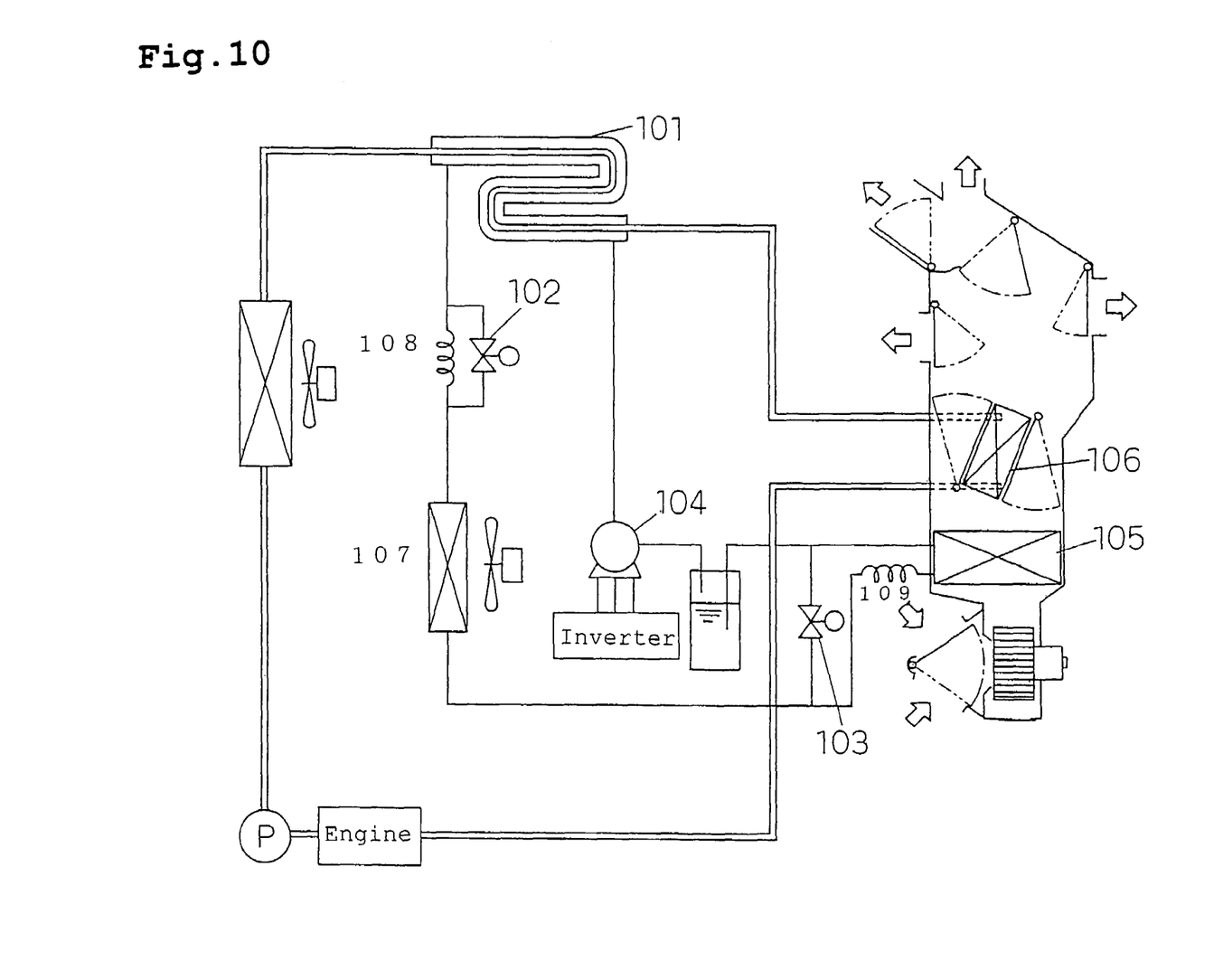
FIG. 10 is a block diagram of a conventional air conditioner for vehicle.

In conventional technology, as shown in FIG. 10, a heat pump type refrigerant cycle includes a (sealed type) motor-driven compressor 104. A refrigerant-to-water heat exchanger 101 was newly attached to its refrigerant circuit as an auxiliary heating means during heating to drive the motor-driven compressor 104 with a first solenoid valve 102 closed and with a second solenoid valve 103 opened if an engine cooling water temperature is not higher than a preset temperature in the case of heating operation designated (refer to Japanese Patent Laid-Open No. 9-66722). The entire disclosure of Japanese Patent Laid-Open No. 9-66722 are incorporated herein by reference in its entirety.

This allows only the refrigerant-to-water heat exchanger 101 to function as a condenser and no refrigerant to be supplied to an evaporator 105. As a result, since no low-temperature refrigerant flows through the evaporator 105, the blowing air is not cooled. Therefore engine cooling water additionally heated by the refrigerant-to-water heat exchanger 101 flows through the heater core 106 to heat blowing air in a duct, so that heating capacity was capable of being enhanced without need for a PTC heater even if an engine cooling water temperature was low.

Such an air conditioner is additionally provided with the refrigerant-to-water heat exchanger 101 as a heating means to heat cooling water. To prevent refrigerant from flowing into the evaporator 105 in heating, solenoid valves 102, 103, pressure-reducing valves 108, 109, and an outdoor heat exchanger 107 are unavoidably necessary, which raises a problem of difficult space saving.

When an engine cooling water temperature is low at the time of heating, even if the refrigerant-to-water heat exchanger 101 is used as an auxiliary heating means, long time was required until a temperature of refrigerant passing through the refrigerant-to-water heat exchanger 101 rises high enough to start up the air conditioner; therefore there occurred a problem that it took long time for an air-conditioning temperature in a vehicle compartment to reach a target temperature, or that cool air was blown off from a heater core to the vehicle compartment inside.

Furthermore, if the evaporator 105 was frosted, defrosting operation was conducted, which caused intermittent operation, thus degrading climate pleasure.

DISCLOSURE OF THE INVENTION

In view of the above-mentioned problem, it is an object of the present invention to provide an air conditioner that achieves space saving, shortens the reach time of a target air-conditioning temperature, and prevents climate comfort from being degraded during defrosting.

The first aspect of the present invention is an air conditioner comprising: a refrigerant cycle having: an evaporator which is disposed in a blowing duct and cools blowing air with refrigerant evaporation; a compressor of setting the evaporated refrigerant at high temperature and high pressure; a refrigerant-to-water heat exchanger of heating cooling water by heat transfer from the refrigerant discharged from said compressor; and an expansion device of decompressing the refrigerant discharged from said heat exchanger, and a cooling water cycle having: a heater core which is disposed on the downstream side of the evaporator on the basis of a blowing direction in said blowing duct and heats blowing air by the heated cooling water; a radiator of cooling the cooling water; a pump of circulating the cooling water cooled by said radiator; a power engine cooled by the cooling water fed by said pump; and said heat exchanger, wherein the refrigerant cycle performs cooling the air for dehumidification when said air conditioner works as a heater.

The second aspect of the present invention is an air conditioner comprising: a refrigerant cycle having: an evaporator which is disposed in a blowing duct and cools blowing air with refrigerant evaporation; a compressor of setting the evaporated refrigerant at high temperature and high pressure; a refrigerant-to-water heat exchanger of heating cooling water by heat transfer from the refrigerant discharged from said compressor; and an expansion device of decompressing the refrigerant discharged from said heat exchanger, and a cooling water cycle having: a heater core which is disposed on the downstream side of said evaporator on the basis of a blowing direction in said blowing duct and heats blowing air by the heated cooling water; a radiator of cooling the cooling water; a pump of circulating the cooling water cooled by said radiator; a power engine cooled by the cooling water fed by said pump; a power engine outlet water temperature detection means of measuring a temperature of the cooling water heated by said power engine; a bypass for connecting an inlet with an outlet for the cooling water of said power engine and for preventing passing through said power engine; a three-way valve installed on a branch portion of said bypass at said inlet of said power engine; a control means of controlling an opening degree of the three-way valve with a value detected by said power engine outlet water temperature detection means; and a cooling water cycle having said heat exchanger.

The third aspect of the present invention is the air conditioner according to the second aspect of the present invention, wherein said control means is a control means of controlling a three-way valve so that the cooling water may bypass said power engine if the power engine outlet water temperature is lower than a prescribed threshold value, and so that the cooling water may flow into said power engine if the power engine outlet water temperature is higher than a prescribed threshold value.

The fourth aspect of the present invention is an air conditioner comprising: a refrigerant cycle having: an evaporator which is disposed in a blowing duct and cools with refrigerant vapor; a compressor of setting the evaporated refrigerant at high temperature and high pressure; a first refrigerant-to-water heat exchanger of heating cooling water by heat transfer from the refrigerant discharged from said compressor; a first expansion device of controlling the decompression of the refrigerant discharged from said first heat exchanger; a second refrigerant-to-water heat exchanger of transferring heat between the refrigerant discharged from said first expansion device and the cooling water; a second expansion device of controlling decompression of the refrigerant discharged from said second heat exchanger; an evaporator inlet refrigerant temperature detection means of measuring a temperature of the refrigerant of which decompression is controlled by said second expansion device; a control means of controlling said first expansion device and said second expansion device using a value detected by said evaporator inlet refrigerant temperature detection means, and a cooling water cycle having: a heater core which is disposed on the downstream side of said evaporator on the basis of a blowing direction in said blowing duct and heats blowing air by the heated cooling water; a radiator of cooling the cooling water; a pump of circulating the cooling water cooled by said radiator; a power engine cooled by the cooling water fed by said pump; and said first heat exchanger and said second heat exchanger.

The fifth aspect of the present invention is the air conditioner according to the fourth aspect of the present invention, wherein the control means is a control means of performing pressure control so that refrigerant may be decompressed by said first expansion device and the second expansion device may be opened if said evaporator inlet refrigerant temperature is lower than such a temperature that frost adheres to said evaporator, and so that said first expansion device may be opened and the refrigerant may be decompressed by said second expansion device if said evaporator inlet refrigerant temperature is higher than such a temperature that frost adheres to said evaporator.

The sixth aspect of the present invention is the air conditioner according to any one of the first, the second or the fourth aspects of the present invention, wherein said heat exchanger is a refrigerant-to-water heat exchanger which has flowing directions of the refrigerant and the cooling water is reverse each other.

The seventh aspect of the present invention is the air conditioner according to any one of the first, the second or the fourth aspects of the present invention, wherein said heat exchanger is a refrigerant-to-water heat exchanger wound around said compressor.

The eighth aspect of the present invention is the air conditioner according to the sixth aspect of the present invention, wherein carbon dioxide is used as the refrigerant.

The ninth aspect of the present invention is the air conditioner according to any one of the first, the second or the fourth aspects of the present invention, further comprising: a bypass for connecting an inlet with an outlet for the cooling water of the heater core and for preventing passing through said heater core; a three-way valve installed on a branch portion of said bypass at said inlet of said heater core; a control means of controlling an opening degree of said three-way valve in accordance with an operation mode.

The tenth aspect of the present invention is the air conditioner according to any one of the first, the second or the fourth aspects of the present invention, wherein said blowing duct is a blowing duct for blowing air into a vehicle compartment and said power engine is a power engine for a vehicle.

The eleventh aspect of the present invention is an air conditioning method using said air conditioner according to the first aspect of the present invention, comprising: a refrigerant cycle step having: an evaporation step of cooling said blowing air by the evaporation of the refrigerant in said blowing duct; a compression step of keeping the evaporated refrigerant at a high temperature and at a high pressure; a refrigerant-to-water heat exchange step of heating the cooling water by heat transfer from said refrigerant discharged from said compression step; and a decompression step of decompressing the refrigerant discharged from said heat exchange step, and a cooling water cycle step having: a step of warming the blowing air by the heated cooling water on the downstream side of said evaporation step on the basis of a blowing direction in said blowing duct, a cooling step of cooling the cooling water with said radiator, a step of circulating the cooling water cooled by said radiator, a step of cooling said power engine using the cooling water discharged by said pump, and said heat exchange step, and which performs cooling the air for dehumidification by means of said refrigerant cycle when said air conditioner works as a heater.

The twelfth aspect of the present invention is an air conditioning method using said air conditioner according to the second aspect of the present invention, comprising: a refrigerant cycle step having: an evaporation step of cooling the blowing air by the evaporation of the refrigerant in said blowing duct; a compression step of keeping the evaporated refrigerant at a high temperature and at a high pressure; a refrigerant-to-water heat exchange step of heating the cooling water by heat transfer from said refrigerant discharged from said compression step; and a decompression step of decompressing the refrigerant discharged from said heat exchange step, and a cooling water cycle step having: a step of warming the blowing air by the heated cooling water on the downstream side of said evaporation step on the basis of a blowing direction in said blowing duct; a cooling step of cooling the cooling water with said radiator; a step of circulating the cooling water cooled by said radiator; a step of cooling the power engine using the cooling water discharged by said pump; a power engine outlet water temperature detection step of measuring a temperature of the cooling water heated by said power engine; a step of controlling said three-way valve; and said heat exchange step.

The thirteenth aspect of the present invention is an air conditioning method using said air conditioner according to the fourth aspect of the present invention, comprising: a refrigerant cycle step having: an evaporation step of cooling the blowing air by the evaporation of the refrigerant in said blowing duct; a compression step of keeping the evaporated refrigerant at a high temperature and at a high pressure; a first refrigerant-to-water heat exchange step of heating the cooling water by heat transfer from the refrigerant discharged from said compression step; a first decompression step of controlling decompression of the refrigerant discharged from said first heat exchange step; a second refrigerant-to-water heat exchange step of transferring heat between the refrigerant discharged from said first decompression step and the cooling water; a second decompression step of controlling decompression of the refrigerant discharged by said second heat exchange step; an evaporator inlet refrigerant temperature detection step of measuring a temperature of the refrigerant of which decompression is controlled by the second decompression step; a step of controlling said first decompression step and said second compression step using a value detected by said evaporator inlet refrigerant temperature detection step, and a cooling water cycle step having: a step of warming blowing air by the heated cooling water in said heater core installed on the downstream side of said evaporator on the basis of a blowing direction in said blowing duct; a cooling step of cooling the cooling water with said radiator; a step of circulating the cooling water cooled by said radiator; a step of cooling said power engine using the cooling water discharged by said pump; said first heat exchange step; and said second heat exchange step.

EXPLANATION OF SYMBOLS

1: blowing duct
2: evaporator
3: compressor
4: refrigerant-to-water heat exchanger
5: expansion device
6: heater core
7: radiator
8: pump
9: power engine
10: three-way valve
11: bypass circuit
12: control means
13: refrigerant cycle
14: cooling water cycle

BEST MODE FOR CARRYING OUT THE INVENTION

Embodiments of the present invention are explained hereinafter in conjunction with drawings.

EMBODIMENT 1

Figure 1:
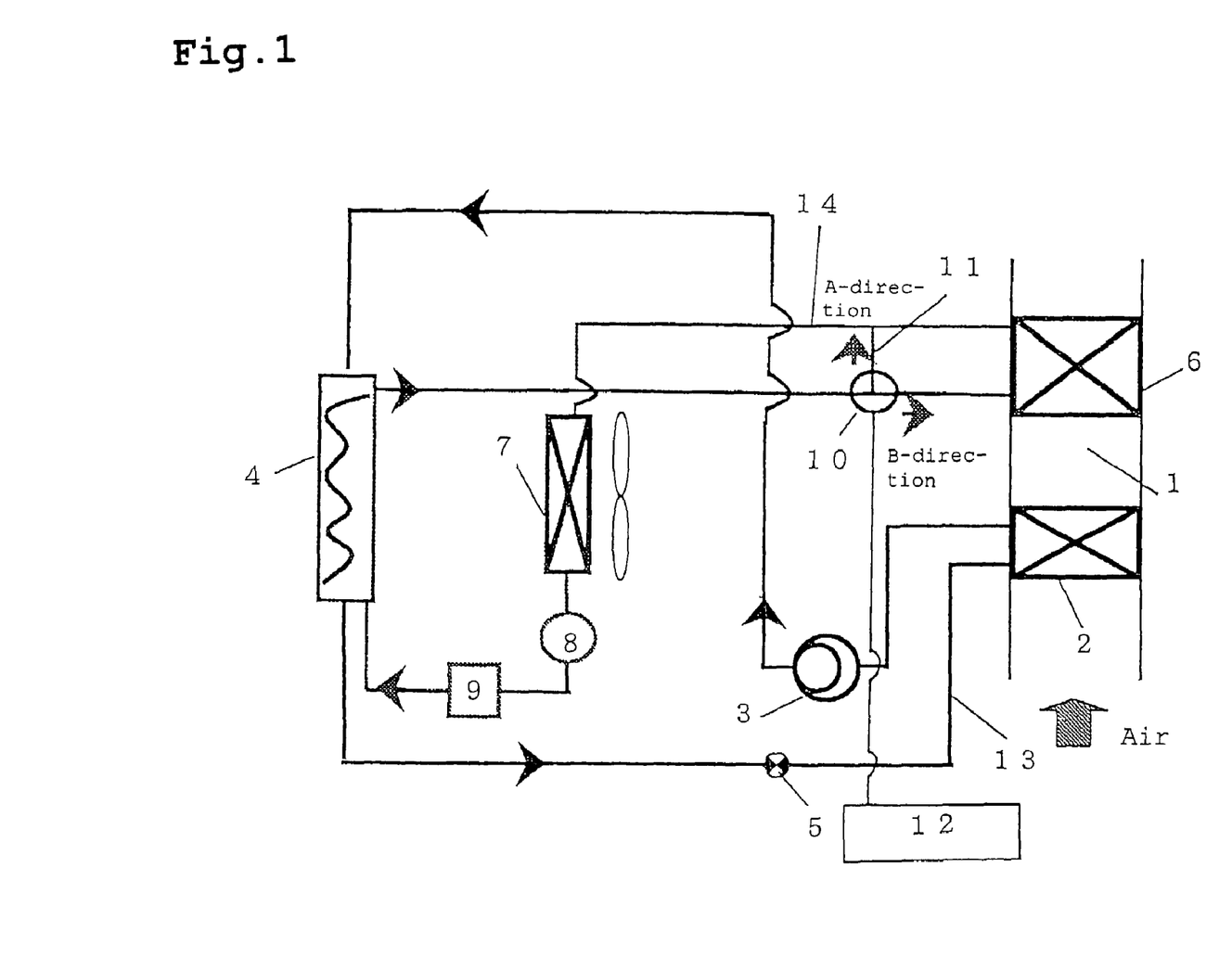
FIG. 1 is a block diagram of an air conditioner for vehicle according to an embodiment 1 of the present invention.

FIG. 1 is a block diagram of an air conditioner for vehicle according to an embodiment 1 of the present invention. An air conditioner for vehicle according to the embodiment 1 includes a refrigerant cycle 13, a cooling water cycle 14, and a blowing duct 1 for feeding temperature-conditioned air into a vehicle.

The refrigerant cycle 13 includes an evaporator 2 of performing air cooling by refrigerant evaporation in the blowing duct 1. A compressor 3 is installed to increase the pressure of the refrigerant evaporated by the evaporator 3. A refrigerant-to-water heat exchanger 4 is also installed to heat cooling water with the refrigerant discharged from the compressor 3. In addition, an expansion device 5 is mounted to decompress refrigerant discharged from the refrigerant-to-water heat exchanger 4 before it is fed into the evaporator 2.

The cooling water cycle 14 includes a heater core 6 installed on the downstream side of the evaporator 2 on the basis of the blast direction in the blowing duct 1, a radiator 7 of cooling cooling water, a pump 8 of circulating cooling water cooled by the radiator 7, a power engine 9 of the vehicle cooled by cooling water, and a refrigerant-to-water heat exchanger 4 of warming refrigerant by cooling water. The power engine 9 is a heating source such as an engine or a fuel battery.

The inlet side of cooling water in the refrigerant-to-water heat exchanger 4 serves as the outlet side of refrigerant, and the outlet side of cooling water serves as the inlet side of refrigerant. That is, directions in which cooling water and refrigerant flow are opposite to each other.

A three-way valve 10 is installed between an outlet of the refrigerant-to-water heat exchanger 4 and an inlet of a heater core 6. There is also provided a bypass circuit 11 connected with the three-way valve 10 as one end and a section between an outlet of the heater core 6 and an inlet of the radiator 7 as the other end. Moreover, a control means 12 is also provided to control the opening direction of the tree-way valve 10 according to an operation mode. Directions in which cooling water flow through the bypass 11 and the heater core 6 are taken as A-direction and B-direction respectively. Arrows in FIG. 1 indicate A-direction and B-direction respectively. The control means 12 is provided to control the three-way valve 10.

Figure 2:
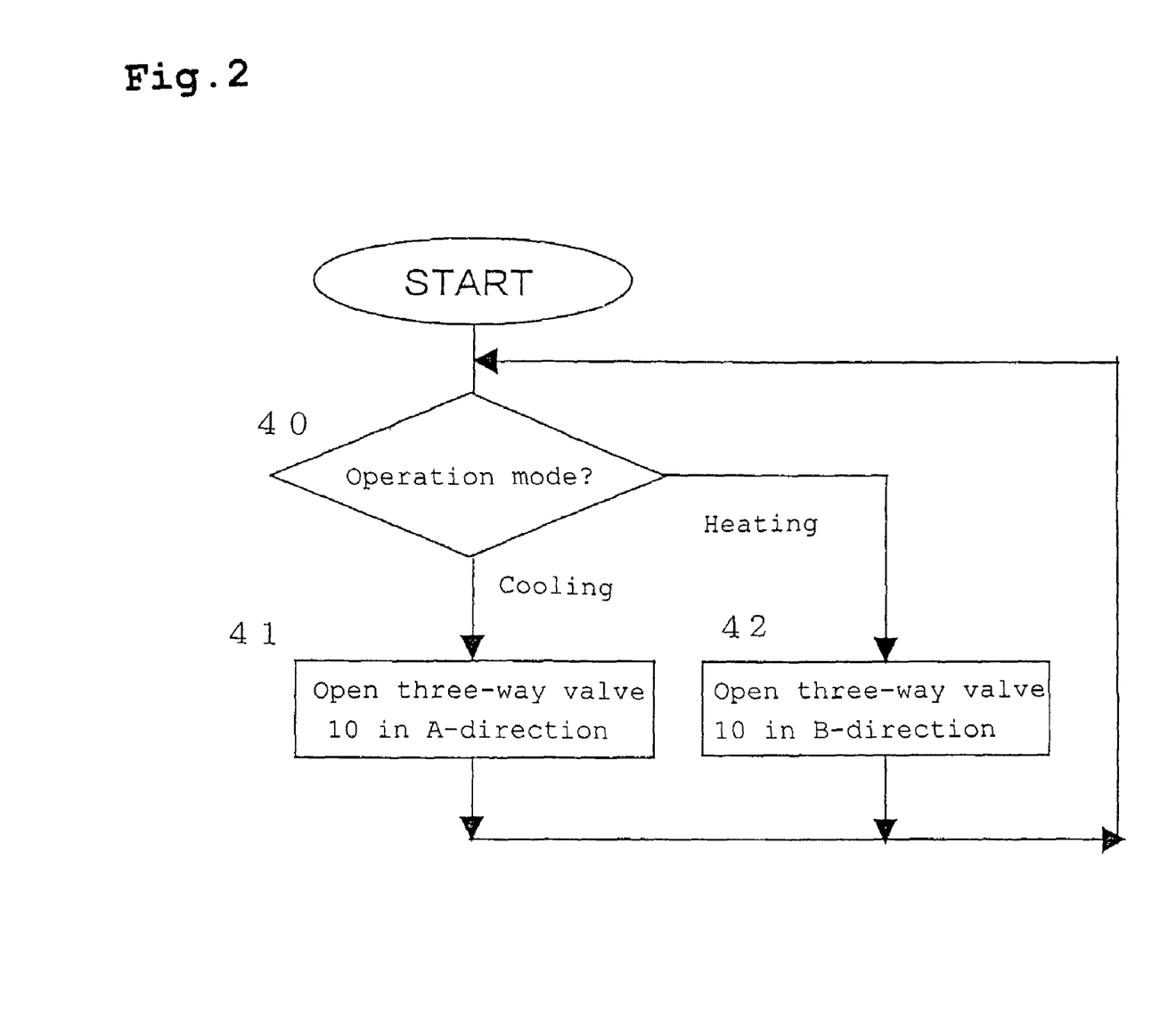
FIG. 2 is a control flow chart of an air conditioner for vehicle according to the embodiment 1 of the present invention.

The operation of the air conditioner for vehicle of the above configuration is explained below using a flow chart as shown in FIG. 2.

It is first detected in step 40 whether the operation mode of the air conditioner is a cooling mode or a heating/dehumidifying mode.

When it is detected as the cooling mode, processing advances to step 41 and the three-way valve 10 is controlled so that high-temperature cooling water may flow through the bypass 11. In FIG. 1, cooling water flows in A-direction as shown by an arrow.

The operation of the refrigerant cycle 13 and the cooling water cycle 14 in a cooling mode is explained below.

At the refrigerant cycle 13 in the cooling mode, when the operation of the air conditioner starts, refrigerant is compressed by the compressor 3 to become high-temperature and high-pressure gas and is heat-radiated to cooling water by the refrigerant-to-water heat exchanger 4. Next, the refrigerant heat-radiated by the refrigerant-to-water heat exchanger 4 is decompressed by the expansion device 5 to be changed into a gas-liquid two-phase state under low temperature and low pressure and introduced into the evaporator 2. In the evaporator 2, refrigerant is evaporated by heat absorption from the interior air to be changed into a gas-liquid two-phase or a gas state and compressed by the compressor 3. Thus, blowing air flowing through inside of the blowing duct 1 is cooled and dehumidified by the evaporator 2.

At a cooling water cycle 14, cooling water is force-fed to the power engine 9 by the pump 8 and heated by the power engine 9. At the refrigerant-to-water heat exchanger 4, cooling water is heated by heat transfer from refrigerant. Next, since the three-way valve 10 is opened in such a direction that cooling water flows through the bypass 11, high-temperature cooling water flows through the bypass 11. Therefore, high-temperature cooling water does not flow through the heater core 6, so that blowing air in the blowing duct 1 is not heated, and it is finally returned to step 40.

In step 40, when the heating/dehumidifying mode is detected, processing advances to step 42, and the three-way valve 10 is controlled so that cooling water flows through the heater core 6. In FIG. 1, cooling water flows in B-direction indicated by an arrow.

The refrigerant cycle 13 and a cooling water cycle 14 in the heating/dehumidifying mode are explained below.

The refrigerant cycle 13 in the heating/dehumidifying mode is the same as for the operation in the cooling mode and an explanation is omitted. The refrigerant cycle 13 operates as a dehumidifying function for blowing air in the blowing duct 1. At the cooling water cycle 14, high-temperature cooling water heated by the power engine 9 and the refrigerant-to-water heat exchanger 4 flows through the heater core 6. Herein blowing air in the blowing duct 1 is warmed up.

By using the refrigerant cycle 13 for dehumidification in the heating mode as well, use of solenoid valves 102, 103, pressure-reducing valve 108, and exterior heat exchanger 107 and so on, which was conventionally needed, can be eliminated, thus achieving space saving.

In the heating/dehumidifying mode, defogging can be performed for a vehicular windshield when an ambient temperature is low.

EMBODIMENT 2

The basic configuration of an air conditioner for vehicle according to an embodiment 2 of the present invention is the same as that of the embodiment 1 and is explained with a focus placed on differences between them. The same constituent elements as for the embodiment 1 have the same numbers on them.

Figure 3:
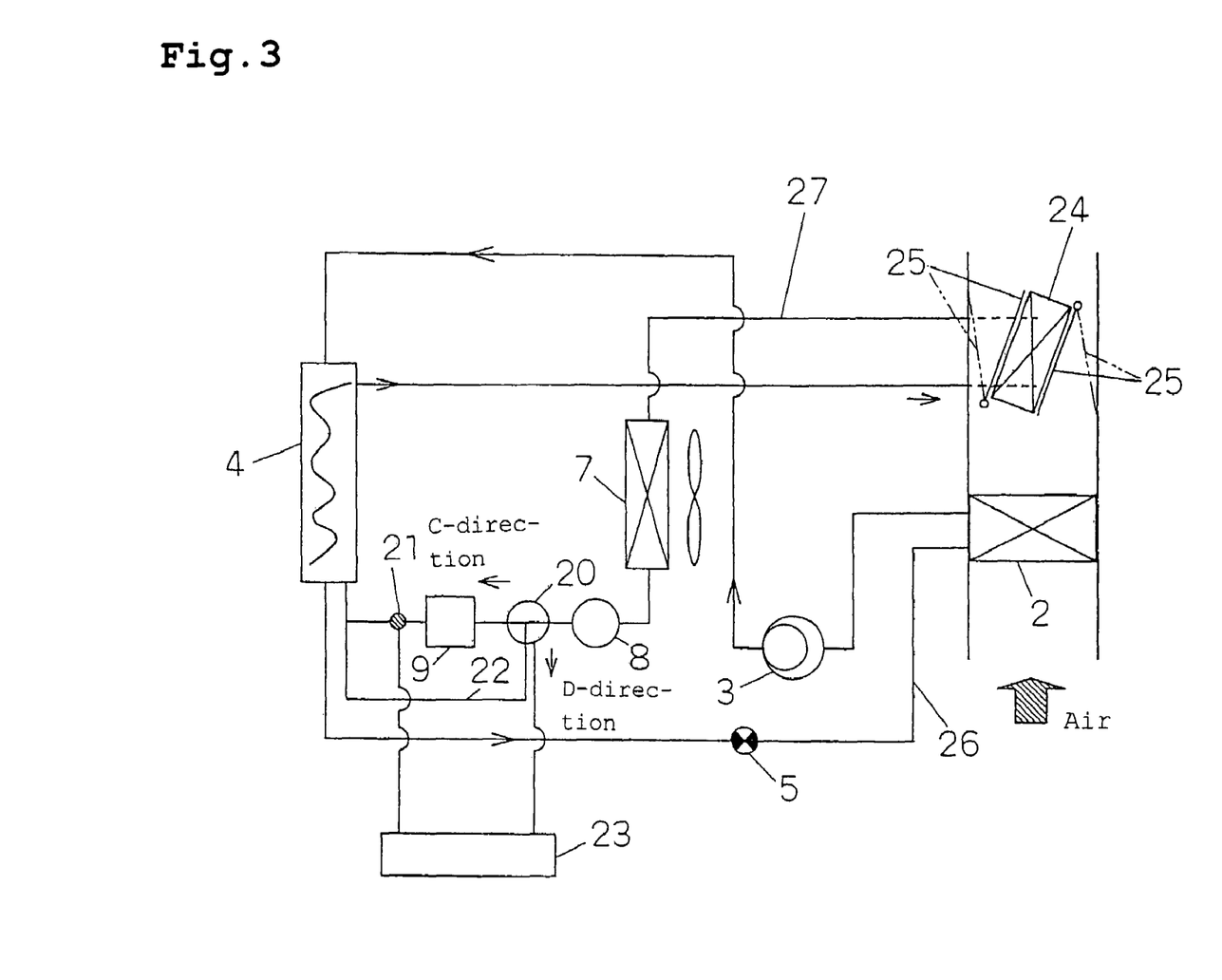
FIG. 3 is a block diagram of an air conditioner for vehicle according to the embodiment 2 of the present invention.

FIG. 3 is a block diagram of an air conditioner for vehicle according to the embodiment 2 of the present invention.

The configuration of the refrigerant cycle 26 is the same as for the embodiment 1 and an explanation is thus omitted. The cooling cycle 27 is different from that of the embodiment 1 and does not include the three-way valve 10, the bypass 11 or the control means 12. A three-way valve 20 is installed between the power engine 9 and the pump 8. There is provided a bypass 22 connected with the three-way valve 20 as one end and a section between the power engine outlet water temperature means 21 and the refrigerant-to-water heat exchanger 4 as the other end.

There is also provided a control means 23 of controlling an opening direction of the three-way valve 20 using a value detected by the power engine outlet water temperature detection means 21. Directions in which cooling water flows through the power engine 15 and the bypass 22 are taken as C-direction and D-direction respectively. Arrows in FIG. 3 indicate C-direction and D-direction respectively.

The heater core 24 of the embodiment 2 includes a damper 25 unlike the heater core 6 of the embodiment 1. The damper 25 is so configured to open and close. When the damper 25 is open, blowing air passes through the heater core 24 and, when the damper 25 is closed, an inflow of blowing air into the heater core 24 is shut down. FIG. 3 indicates an open state of the damper 25 with a two-dot chain line and its closed state with a solid line.

The operation of the air conditioner for vehicle of the above configuration is explained below. The operation in the cooling mode is first described. At the refrigerant cycle 26, the same operation as that of the embodiment 1 is performed, therefore the description of its operation is omitted.

At the cooling water cycle 27, the three-way valve 20 is controlled so that cooling water flows into the power engine 9. Cooling water force-fed by the pump 8 is heated by the power engine 9 and is then further heated by the refrigerant-to-water heat exchanger 4. The cooling water flows through the heater core 24 is heat-radiated further by the radiator 7 and is returned to the pump 8. Since the damper 25 of the heater core 24 is closed, blowing air cannot flow through the heater core 25, so that it is not warmed.

Figure 4:
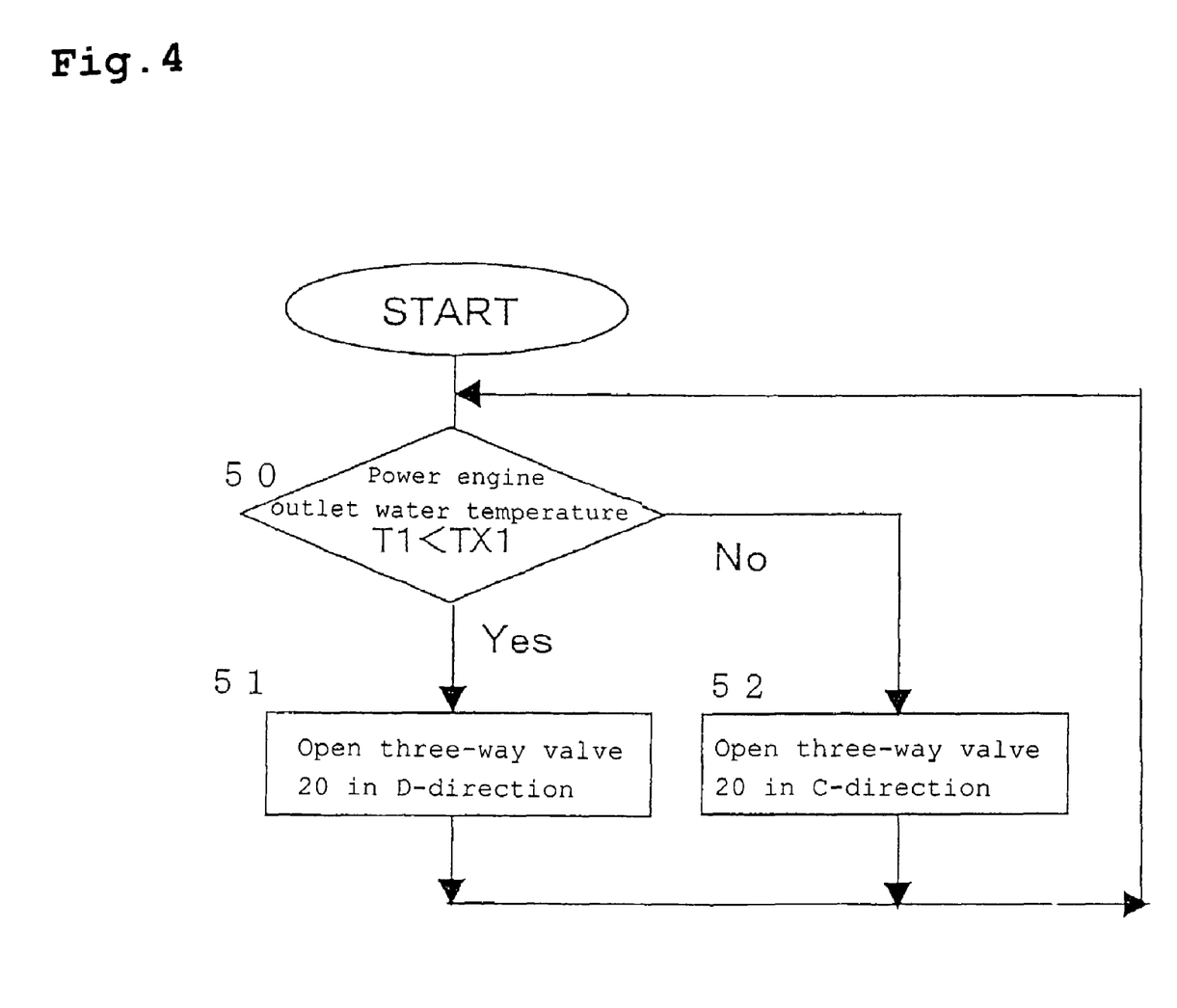
FIG. 4 is a control flow chart of an air conditioner for vehicle according to the embodiment 2 of the present invention.

Next, the operation of the three-way valve 20 in the heating/dehumidifying mode is explained using the flow chart shown in FIG. 4. At the refrigerant cycle 26, the same operation as that of the embodiment 1 is performed, therefore the description of its operation is omitted.

At the cooling water cycle 27, when the operation of the heating/dehumidifying mode starts, a cooling water temperature T1 detected by the power engine outlet water temperature detection means 21 is compared with a desired setting temperature Tx1 (ex. 40° C.) in step 50. The Tx1 is a value set so that a blowing air temperature on interior side may not impair comfort at the time of heating/dehumidifying operation. In the heating/dehumidifying mode, the damper 25 opens and its opening degree is adjusted according to the setting temperature Tx1.

If T1 is smaller than Tx1, this indicates a temperature of the power engine 9 is low; therefore processing advances to step 51. The three-way valve 20 is controlled so that cooling water may flow in D-direction; therefore cooling water does not flow into the power engine 9, but through the bypass circuit 22, and only the cooling water heated by the refrigerant-to-water heat exchanger 4 is circulated in the heater core 24. As a result, the power engine 9 under a low temperature can reduce quantity of heat radiated by the cooling water, enabling the temperature of the cooling water passing through the heater core 24 to rise in a shorter time.

The blowing air flowed into the heater core 24 with the damper 25 opened is warmed by the heated cooling water. After the completion of this control, processing returns to step 50.

If T1 is at least Tx1 in step 50, on the other hand, this indicates that the temperature of the power engine 9 is sufficiently high and the temperature of cooling water is a fixed value or over; therefore processing advances to step 52. The three-way valve 20 is controlled so that cooling water may flow in C-direction; therefore the cooling water heated by the refrigerant-to-water heat exchanger 4 and the power engine 9 flows into the heater core 24. Consequently, the temperature of the cooling water flowing into the heater core 24 can be increased without need for increasing the operation frequency of the compressor 3 for an increase in the heating capacitance of the refrigerant-to-water heat exchanger 4.

The blowing air flowed into the heater core 24 with the damper 25 opened is warmed by the heated cooling water. After the completion of this control, processing returns to step 50.

By controlling the three-way valve 20 at start-up immediately after an operation in the heating/dehumidifying mode, the cooling water flows so that the power engine 9 under a low temperature may be bypassed until the power engine 9 is heated to a fixed temperature. As a result, the amount of heat radiation can be reduced; therefore the temperature of water flowed into the heater core 24 is raised, which can improve quick warming, that is, comfortableness.

EMBODIMENT 3

The basic configuration of an air conditioner for vehicle according to an embodiment 3 of the present invention is the same as that of the embodiment 2 and is explained with a focus placed on differences between them. The same constituent elements as for the embodiment 2 have the same numbers on them.

Figure 5:
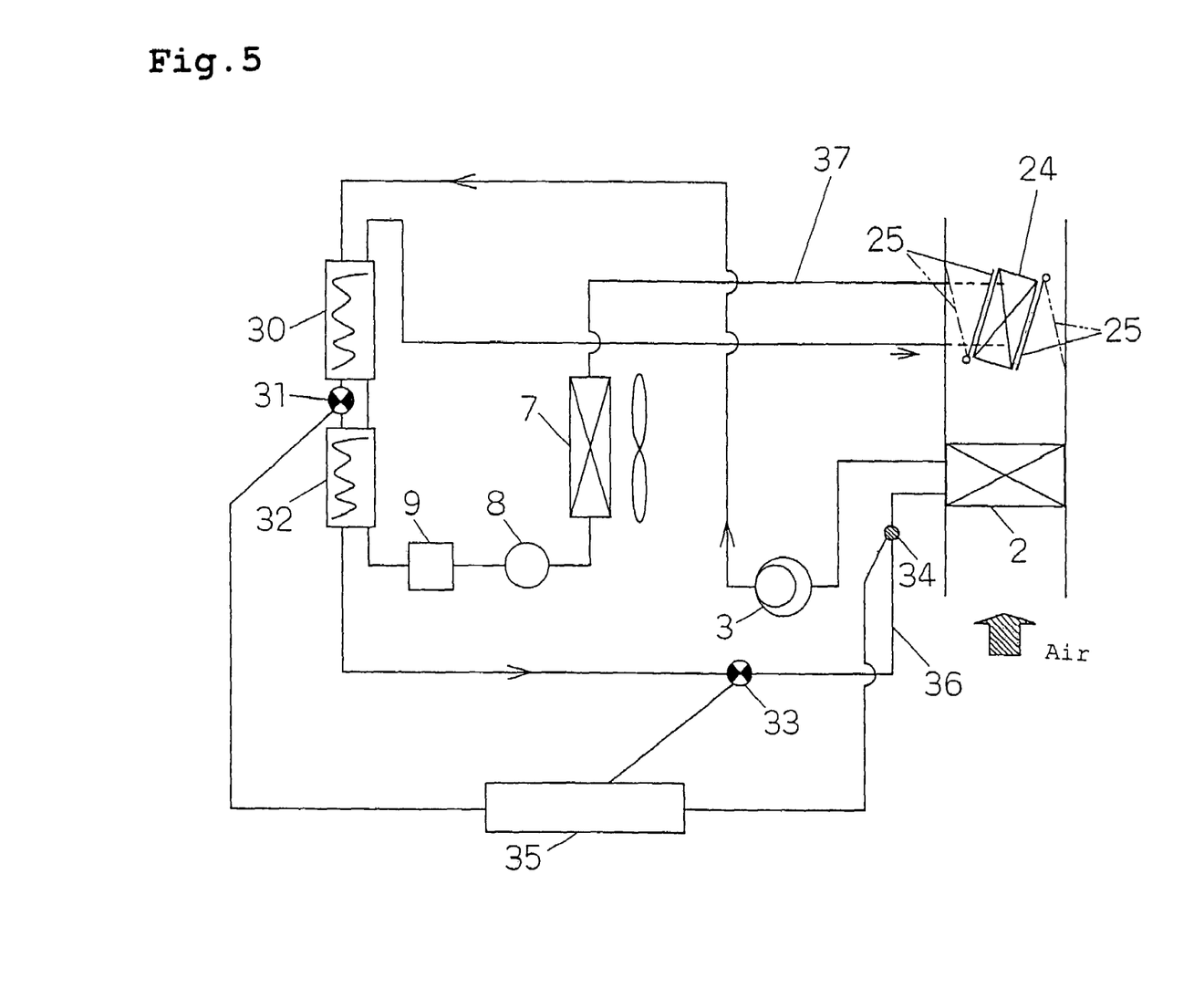
FIG. 5 is a block diagram of an air conditioner for vehicle according to the embodiment 3 of the present invention.

FIG. 5 is a block diagram of an air conditioner for vehicle according to the embodiment 3 of the present invention.

The refrigerant cycle 36 includes the evaporator 2 and the compressor 3 like the embodiment 2. In the embodiment 3, the first refrigerant-to-water heat exchanger 30 and the second refrigerant-to-water heat exchanger 32, and the first expansion device 31 installed between the two refrigerant-to-water heat exchangers 30, 32 are installed in place of the refrigerant heat exchanger 4 in the embodiment 2. The expansion device 12 in the embodiment 2 is corresponding to a second expansion device 33 in the embodiment 3.

Between the second expansion device 33 and the evaporator 2, an evaporator inlet refrigerant temperature detection means 34 is installed. A control means 35 is installed to control the first expansion device 31 and the second expansion device 33 according to a value of the evaporator inlet refrigerant temperature detection means 34. The cooling water cycle 37 does not include the three-way valve 20, the bypass 22, the power engine outlet water temperature detection means 21 or the control means 23 unlike the embodiment 2.

The operation of the air conditioner for vehicle of the above configuration is explained below.

The operation in the cooling mode is first described.

At the refrigerant cycle 36 in the cooling mode, the first expansion device 31 is controlled to be opened so that refrigerant may not be decompressed and the second expansion device 33 is controlled so that refrigerant may be decompressed. As a result, the refrigerant subjected to high temperature and high pressure at the compressor 3 is heat-radiated by transmitting heat to cooling water at the first refrigerant-to-water heat exchanger 30 and the second refrigerant-to-water heat exchanger 32. Next, refrigerant is decompressed by the first expansion device 31, and blowing air in the blowing duct 1 is cooled/dehumidified by the evaporator 2.

In the cooling water cycle 37, the cooling water force-fed by the pump 8 is heated by the power engine 9, then heated by the second refrigerant-to-water heat exchanger 33, and heated by the first refrigerant-to-water heat exchanger 30. Next, the cooling water flows into the heater core 24. The damper 25 of the heater core 24 is closed, and blowing air never flows into the heater core 24, so that blowing air is not warmed, and is then heat-radiated by the radiator 7 and returned to the pump 8.

Figure 6:
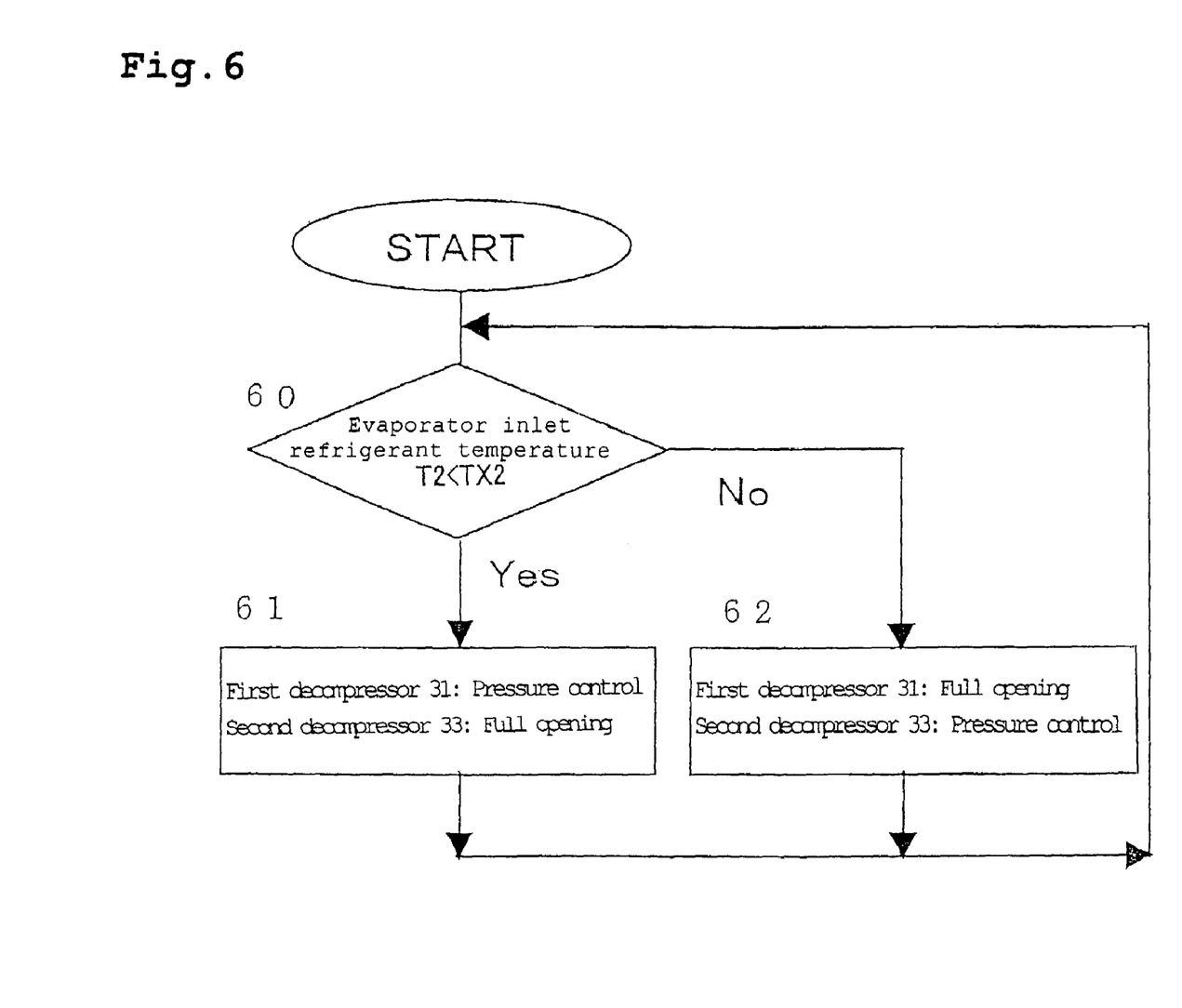
FIG. 6 is a control flow chart of an air conditioner for vehicle according to the embodiment 3 of the present invention.

The operations of the first expansion device 30 and the second expansion device 32 in the heating/dehumidifying mode are explained below, using a flow chart of FIG. 6.

At the refrigerant cycle 36, in the heating/dehumidifying mode, first, a refrigerant temperature T2 detected by the evaporator inlet temperature detection means 34 is compared with a target setting temperature Tx2 (ex. 0° C.) in step 60. The Tx2 is a temperature preset so that the evaporator 2 may not be frosted.

If T2 is smaller than Tx2 in step 60, this indicates the possibility that the evaporator 2 may be frosted. Processing advances to step 61, in which the first expansion device 31 is controlled so that refrigerant may be decompressed and the second expansion device 33 is controlled to be fully opened so that refrigerant may not be decompressed, and processing returns to step 60.

Figure 7:
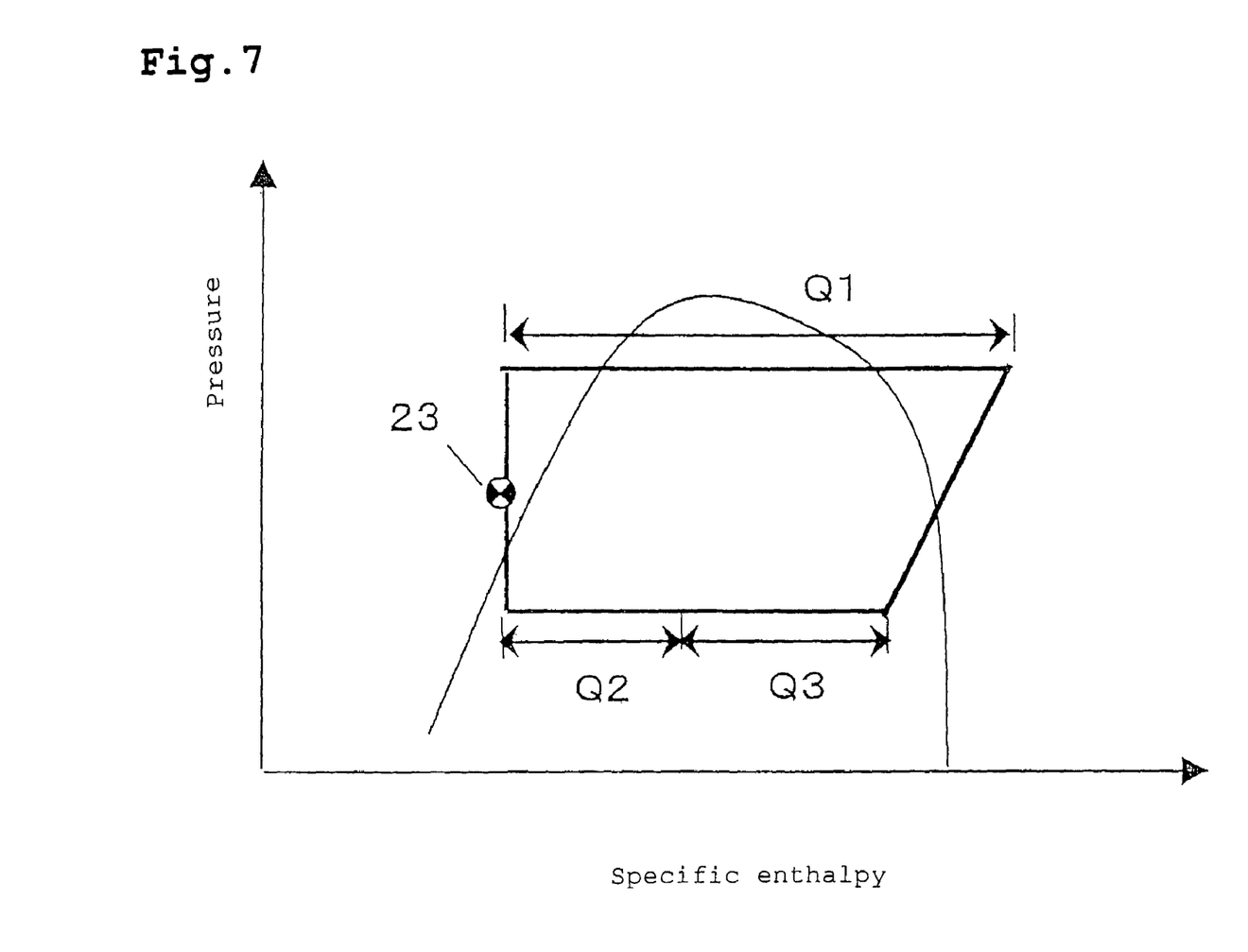
FIG. 7 is a Mollier diagram of an air conditioner for vehicle according to the embodiment 3 of the present invention.

FIG. 7 is a Mollier diagram of a state of the refrigerant cycle 36. The heat radiation amount of the first refrigerant-to-water heat exchanger 30 is denoted as Q1, the heat absorption amount of the second refrigerant-to-water heat exchanger 32 is denoted as Q2, and the heat absorption amount of the evaporator 2 is denoted as Q3. In the embodiment 3, the first refrigerant-to-water heat exchnager 30 acts as a radiator and the second refrigerant heat exchanger 32 acts as an evaporator; therefore heat exchange heat-transfer area acting as the evaporator increases and evaporation temperature rises, thus avoiding frosting of the evaporator 2.

If T2 is Tx2 or higher, there is low possibility of the evaporator 2 being frosted, and processing advances to step 62, in which the first expansion device 31 is controlled so as to fully open and the second expansion device 33 is controlled so as to obtain decompression, and processing advances to step 60.

Figure 8:
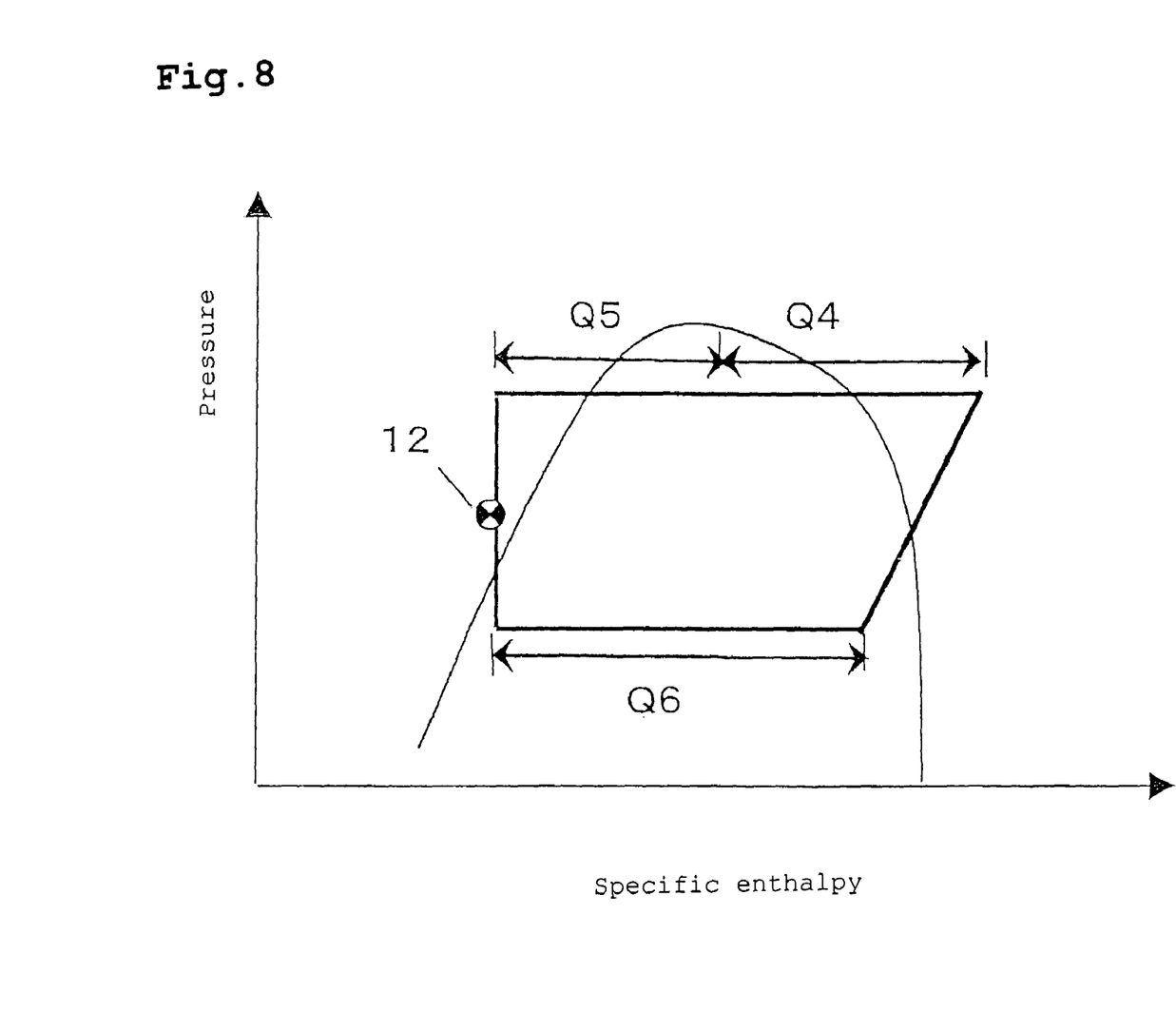
FIG. 8 is a Mollier diagram of an air conditioner for vehicle according to the embodiment 3 of the present invention.

FIG. 8 is a Mollier diagram of a state of the refrigerant cycle 36. The heat radiation amount of the first refrigerant-to-water heat exchanger 30 is denoted as Q4, the heat radiation amount of the second refrigerant-to-water heat exchanger 32 is denoted as Q5, and the heat absorption amount of the evaporator 2 is denoted as Q6. In the embodiment 3, the heat absorption amount of the interior evaporator 2 is kept maximum, that is, heating operation is possible while dehumidifying amount is being kept maximum.

At the cooling water cycle 37 in the heating/dehumidifying mode, the damper 25 of the heater core 24 is kept open, so that blowing air is warmed by passing through the heater core 24.

By controlling the first expansion device 31 and the second expansion device 33 in the heating/dehumidifying mode, the second refrigerant-to-water heat exchanger 32 is made to act as an evaporator to increase evaporation temperature, thus avoiding frosting of the evaporator 2 without degrading comfortableness.

This air conditioner for vehicle configured by combining the cooling water cycle 27 of the embodiment 2 with the refrigerant cycle 36 of the embodiment 3 may be used. In this case, quick warming, that is, comfortableness can be improved at start-up immediately after the operation in the heating/dehumidifying mode. Moreover, frosting of the evaporator 2 can be avoided without any impairment of the comfortableness.

In the embodiments 2, 3, a bypass for connecting an inlet with an outlet of cooling water to the heater core as mentioned in the embodiment 1 may be installed without installing the heater core 24 provided with the damper 25 to form such a configuration that no high-temperature cooling water passes the heater core at the time of cooling.

EMBODIMENT 4

Figure 9:
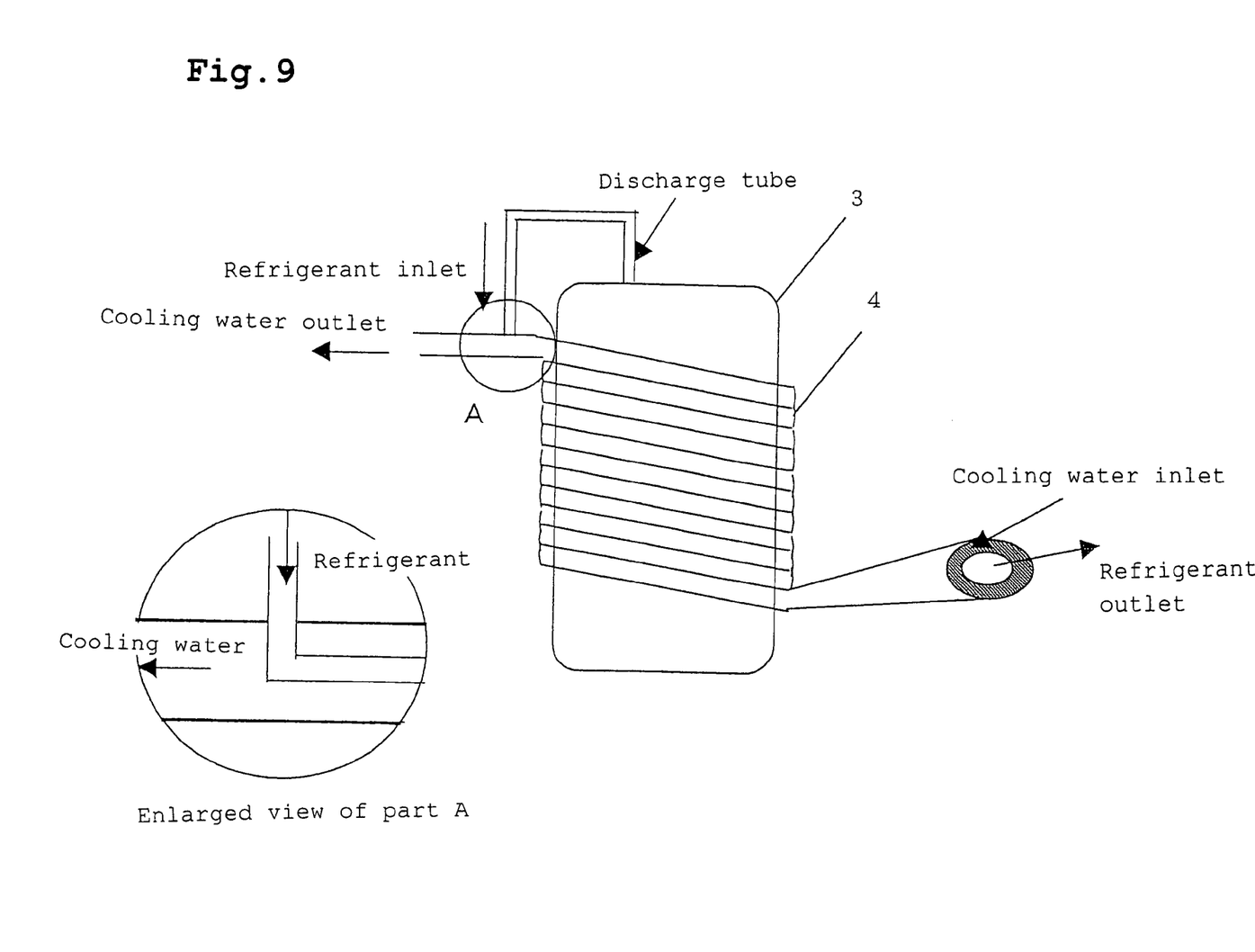
FIG. 9 is a block diagram of a compressor and a refrigerant-to-water heat exchanger according to the embodiment 4 of the present invention.

FIG. 9 is a block diagram of an integrated type of structure of the compressor 3 and a refrigerant-to-water heat exchanger 4 according to the embodiment 4 of the present invention.

The refrigerant-to-water heat exchanger 4 in FIG. 9 is of a double tube and is configured so that refrigerant flows through its inside and water flows through its outside in a counterflow manner. The refrigerant-to-water heat exchanger 4 is wound around the compressor 3. An enlarged view of A-section indicates an inlet portion of the refrigerator water heat exchanger 4 for refrigerant subjected to high temperature and high pressure by the compressor 3. As illustrated, a refrigerant tube is smaller than a cooling water tube, and is configured so as to go into the inside of the cooling water tube from the outlet side of the refrigerant-to-water heat exchanger 4 for cooling water and to go out from the inside of the cooling water tube from the inlet side of the refrigerant-to-water heat exchanger 4 for cooling water.

The refrigerant-to-water heat exchanger 4 formed out of a double tube is wound around the outer casing of the compressor 3, which provides more space saving than in the case where the compressor 3 and the refrigerant-to-water heat exchanger 4 are installed individually.

In the cooling mode, the heat radiation of the compressor can be improved further to restrain an excessive temperature rise in the refrigerant discharged from the compressor 3, thus achieving higher reliability of the air conditioner.

In the heating/dehumidifying mode, the heat radiation from the compressor 3 can be used as a heating source for cooling water, thus raising the temperature of water flowing through the heater cores 4 and 24 in a shorter time.

The configuration of the refrigerant-to-water heat exchanger of the present invention is not limited to the double-tube configuration, and various types of configurations capable of heat transfer between refrigerant and cooling water may be used.

The refrigerant-to-water heat exchanger of the present invention uses a counterflow arrangement, in which the flowing directions of cooling water and refrigerant are opposite to each other, however, may use the same-direction arrangement.

However, in the case of HCFC refrigerant or HFC refrigerant which has been conventionally used, a temperature change in the refrigerant is seldom found while a gas-liquid two-phase is being condensed. In the case that refrigerant is carbon dioxide, high-pressure side is supercritical cycle; therefore heat radiation is performed while a temperature change is always being made.

Where heat exchange is performed so that refrigerant and cooling water may have a counterflow manner like a water refrigerant heat exchanger of the present invention, a temperature difference between refrigerant and water is small and a temperature gradient is almost balanced as compared to conventional refrigerant. Therefore, carbon dioxide can be used as refrigerant, and higher heat exchange efficiency can be achieved and the operation of an air conditioner can be performed with high COP (coefficient of performance of refrigerant cycle).

The first and second expansion devices of the first and second aspects of present inventions correspond to the expansion device 5 in the embodiments 1, 2, and the first and second expansion devices of the fourth aspect of the present invention correspond to the first expansion device 31 and the second expansion device 33 in the embodiment 3. In the embodiments 1, 2, 3, the expansion device of the present invention is formed out of a valve capable of adjusting a flow rate, but it is not limited to this configuration. Various types of compressor capable of controlling fluid pressure may be used.

The power engine and air conditioner of the present invention correspond to a power engine and an air conditioner for vehicle in the embodiments 1, 2, 3 or 4. The present invention is not limited to use for vehicles, but applicable to various types of power engines and air conditioners used in plans and aircrafts.

As can be clearly understood from the foregoing explanation, the present invention can provide air conditioning operation while attaining space saving.

At the time of start-up immediately after heating/dehumidifying mode operation, heat radiation amount can be made small, enabling the temperature of water passing through the heater core to rise in a shorter time and improving quick warming or comfortableness.

In the heating/dehumidifying mode, evaporation temperature can be raised, thus avoiding frosting of an evaporator without impairing comfortableness.

By adopting such an integrated type of structure that a refrigerant-to-water heat exchanger covers the outer casing of a compressor, space saving can be achieved.

By using carbon dioxide as refrigerant, higher heat exchange efficiency than conventional refrigerant can be attained to realize air conditioning operation with high COP.

The invention claimed is:

1. An air conditioner comprising:
   a refrigerant cycle having: an evaporator which is disposed in a blowing duct and cools by refrigerant evaporation; a compressor setting the evaporated refrigerant at high temperature and high pressure; a first refrigerant-to-water heat exchanger heating cooling water by heat transfer from the refrigerant discharged from said compressor; a first expansion device controlling the decompression of the refrigerant discharged from said first heat exchanger; a second refrigerant-to-water heat exchanger transferring heat between the refrigerant discharged from said first expansion device and the cooling water; a second expansion device controlling decompression of the refrigerant discharged from said second heat exchanger; an evaporator inlet refrigerant temperature detection means of measuring a temperature of the refrigerant of which decompression is controlled by said second expansion device; a control means of controlling said first expansion device and said second expansion device using a value detected by said evaporator inlet refrigerant temperature detection means, and a cooling water cycle having: a heater core which is disposed on the downstream side of said evaporator on the basis of a blowing direction in said blowing duct and which heats blowing air by the heated cooling water; a radiator cooling the cooling water; a pump circulating the cooling water cooled by said radiator; a power engine cooled by the cooling water fed by said pump; and said first heat exchanger and said second heat exchanger.

2. The air conditioner according to claim 1, wherein the control means performs pressure control so that refrigerant may be decompressed by said first expansion device and the second expansion device may be opened if said evaporator inlet refrigerant temperature is lower than a temperature where frost adheres to said evaporator, and so that said first expansion device may be opened and the refrigerant may be decompressed by said second expansion device if said evaporator inlet refrigerant temperature is higher than such temperature where frost adheres to said evaporator.

3. The air conditioner according to claim 1, wherein said atleast one of said heat exchanges a refrigerant-to-water heat exchanger where flowing directions of the refrigerant and the cooling water are reverse to each other.

4. The air conditioner according to claim 3, wherein carbon dioxide is used as the refrigerant.

5. The air conditioner according to claim 1, wherein said heat exchanger is a refrigerant-to-water heat exchanger wound around said compressor.

6. The air conditioner according to claim 1, further comprising: a bypass for connecting an inlet with an outlet for the cooling water of the heater core and for preventing the cooling water passing through said heater core; a three-way valve installed on a branch portion of said bypass at said inlet of said heater core; a control means of controlling an opening degree of said three-way valve in accordance with an operation mode.

7. The air conditioner according to claim 1, wherein said blowing duct is a blowing duct for blowing air into a vehicle compartment and said power engine is a power engine for a vehicle.

8. An air conditioning method using said air conditioner according to claim 1, comprising:

a refrigerant cycle step having: an evaporation step cooling the blowing air by the evaporation of the refrigerant in said blowing duct; a compression step keeping the evaporated refrigerant at a high temperature and at a high pressure; a first refrigerant-to-water heat exchange step heating the cooling water by heat transfer from the refrigerant discharged from said compression step; a first decompression step controlling decompression of the refrigerant discharged from said first heat exchange step; a second refrigerant-to-water heat exchange step transferring heat between the refrigerant discharged from said first decompression step and the cooling water; a second decompression step controlling decompression of the refrigerant discharged by said second heat exchange step; an evaporator inlet refrigerant temperature detection step measuring a temperature of the refrigerant where decompression is controlled by the second decompression step; a step of controlling said first decompression step and said second compression step using a value detected by said evaporator inlet refrigerant temperature detection step, and a cooling water cycle step having: a step of warming blowing air by the heated cooling water in said heater core which is installed on the downstream side of said evaporator on the basis of a blowing direction in said blowing duct; a cooling step cooling the cooling water with said radiator; a step of circulating the cooling water cooled by said radiator; a step of cooling said power engine using the cooling water discharged by said pump; said first heat exchange step; and said second heat exchange step.

* * * * *